(12) United States Patent
McCormack et al.

(10) Patent No.: US 9,020,134 B1
(45) Date of Patent: Apr. 28, 2015

(54) SYSTEM AND METHOD FOR AUTOMATED ASSIGNMENT OF MONITORING IN A CONTACT CENTER

(71) Applicant: Avaya Inc., Basking Ridge, NJ (US)

(72) Inventors: Tony McCormack, Galway (IE); Fintan Hynes, Galway (IE); Paul D'Arcy, Caherconlish (IE)

(73) Assignee: Avaya, Inc., Basking Ridge, NJ (US)

( * ) Notice: Subject to any disclaimer, the term of this patent is extended or adjusted under 35 U.S.C. 154(b) by 0 days.

(21) Appl. No.: 14/046,452

(22) Filed: Oct. 4, 2013

(51) Int. Cl.
*H04M 3/00* (2006.01)
*H04M 5/00* (2006.01)
*H04M 3/51* (2006.01)

(52) U.S. Cl.
CPC ...... *H04M 3/5175* (2013.01); *H04M 2203/402* (2013.01)

(58) Field of Classification Search
CPC ..... H04M 3/36; H04M 3/42221; H04M 3/51; H04M 3/523; H04M 3/5175; H04M 3/5183; H04M 3/5166; H04M 3/5191; H04M 3/5237
USPC .............. 379/265.01, 265.02, 265.03, 265.06
See application file for complete search history.

(56) References Cited

U.S. PATENT DOCUMENTS

| | | | |
|---|---|---|---|
| 5,570,410 A * | 10/1996 | Hooshiari | 379/32.03 |
| 5,920,622 A * | 7/1999 | Erb et al. | 379/204.01 |
| 8,363,817 B2 * | 1/2013 | McCormack et al. | 379/265.12 |
| 2004/0103186 A1 * | 5/2004 | Casati et al. | 709/224 |
| 2008/0199000 A1 * | 8/2008 | Su et al. | 379/265.06 |
| 2009/0080409 A1 * | 3/2009 | Jayapalan et al. | 370/352 |
| 2009/0083380 A1 * | 3/2009 | Smyth et al. | 709/206 |
| 2011/0007889 A1 * | 1/2011 | Geffen et al. | 379/265.06 |
| 2012/0093306 A1 * | 4/2012 | McCormack et al. | 379/265.01 |
| 2014/0098949 A1 * | 4/2014 | Williams | 379/265.09 |
| 2014/0270138 A1 * | 9/2014 | Uba et al. | 379/265.06 |

* cited by examiner

*Primary Examiner* — Khai N Nguyen
(74) *Attorney, Agent, or Firm* — Maldjian Law Group LLC; John Maldjian; Alexander D. Walter

(57) ABSTRACT

A system for automated assignment of monitoring customer-agent interactions is provided. A metadata extraction module configured to extract metadata related to each of a plurality of customer-agent interactions is disclosed. Further, a resource attribute collection module configured to collect attributes about each of a plurality of supervisor resources in the communication system is disclosed. Additionally, an assignment module configured to assign one of the plurality of supervisor resources to monitor one of the plurality of customer-agent interactions based on the extracted metadata and the collected attributes is disclosed.

20 Claims, 3 Drawing Sheets

SYSTEM AND METHOD FOR AUTOMATED ASSIGNMENT OF MONITORING IN A CONTACT CENTER

BACKGROUND

1. Field of the Invention

Embodiments of the present invention generally relate to a system and method for assignment of monitoring in a communication system. More specifically, embodiments of the present invention provide a system and method for automating the assignment of monitoring interactions between customers and agents in a contact center.

2. Description of Related Art

In a communication system, such as a contact center, it is common practice for supervisors to observe live interactions between customers and agents (referred to as "customer-agent interactions".) For example, a supervisor may observe a customer-agent interaction by listening in on a phone conversation between a customer and an agent. As another example, a supervisor may observe a customer-agent interaction by following along on an instant message conversation between a customer and an agent. Observing customer-agent interactions may be done, for example, to monitor the quality of service provided by the agents, to coach the agents, to ensure that regulatory requirements are being followed, to correct undesired behavior, etc.

In traditional contact centers, supervisors are alerted to possible customer-agent interactions that may require their attention. The supervisors may then select which customer-agent interactions to observe. For example, supervisors may be alerted to particular customer-agent interactions that may require their attention based on keywords identified in the interactions (e.g., the use of profanity, low sentiment, or the like.) The supervisor can decide which calls to observe from those identified.

The process for identifying and assigning supervisors to monitor customer-agent interactions, however, requires supervisors to manually select which customer-agent interaction to observe. The assignment of which interactions to observe must happen quickly, due to the real-time nature of the interactions. Furthermore, there is a limited amount of information that can manually be processed by supervisors in making a decision about which interaction to observe. As such, it is difficult for the supervisors to optimally select the customer agent interactions to monitor using conventional techniques.

Thus there is a need for a system and method for automatically assigning monitoring of interactions that optimizes the usage of supervisors in the call center.

SUMMARY

Embodiments in accordance with the present invention provide a system for automated assignment of monitoring to supervisor resources in a communication system. The system including a metadata extraction module configured to extract metadata related to each of a plurality of customer-agent interactions, a resource attribute collection module configured to collect attributes about each of a plurality of supervisor resources in the communication system, and an assignment module configured to assign one of the plurality of supervisor resources to monitor one of the plurality of customer-agent interactions based on the extracted metadata and the collected attributes.

Embodiments in accordance with the present invention further provide a computer-implemented method for automated assignment of monitoring customer-agent interactions in a communication system. The computer-implemented method including extracting metadata related to each of a plurality of customer-agent interactions, collecting attributes about each of a plurality of supervisor resources in the communication system, and assigning one of the plurality of supervisor resources to monitor one of the plurality of customer-agent interactions based on the extracted metadata and the collected attributes.

Embodiments in accordance with the present invention further provide a computer readable medium storing computer readable instructions when executed by a processor perform a method that includes extracting metadata related to each of a plurality of customer-agent interactions, collecting attributes about each of a plurality of supervisor resources in the communication system, and assigning one of the plurality of supervisor resources to monitor one of the plurality of customer-agent interactions based on the extracted metadata and the collected attributes.

The present invention can provide a number of advantages depending on a particular configuration. First, embodiments of the present invention provide an adaptive mechanism that uses strategic Avaya Aura® and Avaya Experience Manager® contact center architecture to intelligently assign supervisors to monitor customer-agent interactions. Avaya Aura® and Avaya Experience Manager® are core communication platforms supporting unified communications and contact center solutions for enterprises. Although Avaya® systems are used in this application for illustrative purposes, it should understood by one of ordinary skill in the art that any communications platform or for that matter contact center platform that supports customer-agent interaction monitoring and contact center solutions is contemplated by the present invention and that the Avaya® systems are used by way of example only and for simplicity of explaining embodiments of the present invention.

Embodiments of the present invention apply advanced work assignment technology, e.g., Avaya Experience Manager® to make real-time decisions on the supervisor's behalf regarding which customer-agent interactions should be monitored and matches appropriate customer-agent interactions the most appropriate available supervisor.

Furthermore, the present invention is applicable in any enterprise in addition to traditional contact center. Any enterprise that requires managing the monitoring of interactions by supervisors may use embodiments of the present invention to automatically assign supervisors to monitor the interactions.

These and other advantages will be apparent from the disclosure of the present invention contained herein.

The preceding is a simplified summary of the present invention to provide an understanding of some aspects of the present invention. This summary is neither an extensive nor exhaustive overview of the present invention and its various embodiments. It is intended neither to identify key or critical elements of the present invention nor to delineate the scope of the present invention but to present selected concepts of the present invention in a simplified form as an introduction to the more detailed description presented below. As will be appreciated, other embodiments of the present invention are possible, utilizing one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings, and wherein.

Figure 1:
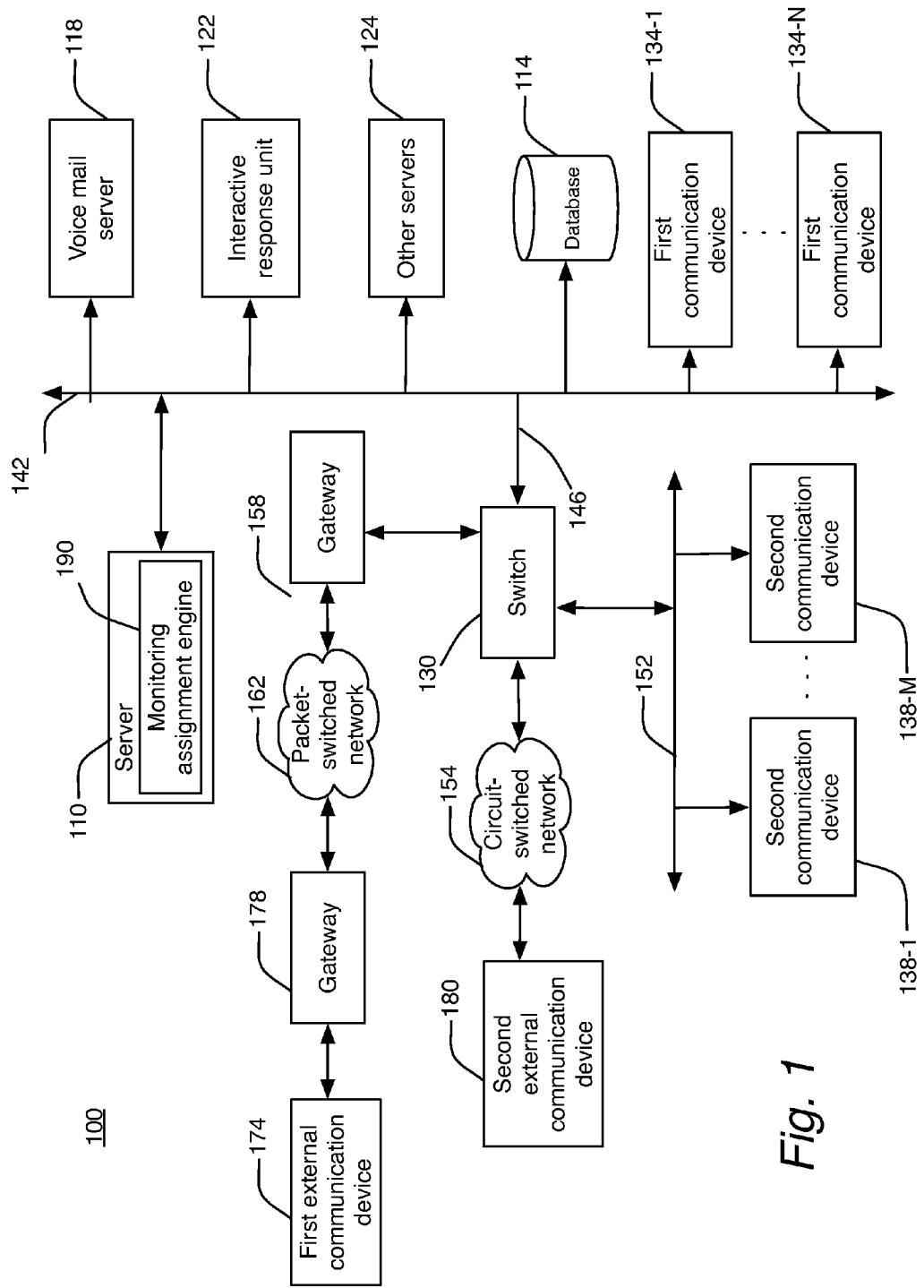
FIG. 1 is a block diagram depicting an illustrative communication system according to an embodiment of the present invention.

The headings used herein are for organizational purposes only and are not meant to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including but not limited to. To facilitate understanding, like reference numerals have been used, where possible, to designate like elements common to the figures.

DETAILED DESCRIPTION

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read.

A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the present invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present invention is described in terms of exemplary embodiments, it should be appreciated those individual aspects of the present invention can be separately claimed.

The term "switch" or "server" as used herein should be understood to include a PBX, an ACD, an enterprise switch, or other type of communications system switch or server, as well as other types of processor-based communication control devices such as media servers, computers, adjuncts, etc.

The present invention will be illustrated below in conjunction with an exemplary communication system, e.g., the Avaya Aura® and/or Avaya Experience Manager® systems. Although well suited for use with, e.g., a system having customer-agent interaction monitoring hardware and/or software, the present invention is not limited to any particular type of communication system or configuration of system elements. Those skilled in the art will recognize the disclosed techniques may be used in any communication application in which it is desirable to provide improved assignment of monitoring customer-agent interactions.

FIG. 1 shows an illustrative communication system in which the present invention may be implemented. The communion system is illustrated using an example contact center 100, which comprises a server 110 (described in greater detail below), a set of data stores or databases 114 containing contact or customer related information and/or other information that can enhance the value and efficiency of the assignment of monitoring interactions, and a plurality of servers, namely a voice mail server 118, an Interactive Response unit (e.g., IVR) 122, and other servers 124, a switch 130, a combination of agents and supervisors operating packet-switched (first) communication devices 134-1 to N (such as computer work stations or personal computers), and/or circuit-switched (second) communication devices 138-1 to M, all interconnected by a local area network LAN (or wide area network WAN) 142.

The servers can be connected via optional communication lines 146 to the switch 130. As will be appreciated, the other servers 124 can also include a scanner (which is normally not connected to the switch 130 or Web server), VoIP software, video call software, voice messaging software, an IP voice server, a fax server, a web server, an email server, and the like. The switch 130 is connected via a plurality of trunks to the Public Switch Telephone Network or PSTN 154 and via link(s) 152 to the second communication devices 138-1 to M. A gateway 158 is positioned between the switch 130 and the packet-switched network 162 to process communications passing between the switch 130 and the network 162.

As stated above, a combination of agents and supervisors operate the first and second communication devices 134-1 to 134N and 138-1 to 138-M. During operation of the contact center 100, agents operating first communication devices 134-1 to N and/or second communication devices 138-1 to M engage in interactions, i.e., customer-agent engagements, with customers contacting the contact center. The customers may use first and second external communication devices 174 and 180 to contact the contact center. It is to be appreciated, that the external communication devices are shown in a quantity to facilitate understanding and that in practice, more than two external communication devices will typically be provided. As such, the number of illustrated external communication devices is not intended to be limiting.

As stated, it is often desirable to have supervisors monitor some of these customer-agent interactions. For example, customer-agent interactions may be monitored to ascertain the quality of service provided by the agents, to coach agents, to ensure that regulatory requirements are being followed, to correct undesired behavior, etc. The server 110 includes a monitoring assignment engine 190 (explained in greater detail below with reference to FIG. 2) to assign supervisors operating first communication devices 134-1 to N and/or second communication devices 138-1 to M to monitor ones of the customer-agent interactions occurring within the contact center 100.

Although this embodiment is discussed with reference to client-server architecture, it is to be understood that the principles of the present invention apply to other network architectures. For example, the present invention applies to peer-to-peer networks, such as those envisioned by the Session Initiation Protocol. In the client-server model or paradigm, network services and the programs used by end users to access the services are described. The client side provides a user with an interface for requesting services from the network, and the server side is responsible for accepting user requests for services and providing the services transparent to the user. By contrast in the peer-to-peer model or paradigm, each networked host runs both the client and server parts of an application program. Additionally, the invention does not require the presence of packet- or circuit-switched networks.

The switch 130 can be any architecture for establishing customer-agent interactions between customers contacting the contact center and agents of the contact center. Additionally, the server 110 can be any architecture for assigning supervisors to monitor the established customer-agent interactions. In some embodiments, the switch 130 may perform load-balancing functions by allocating incoming or outgoing contacts among a plurality of logically and/or geographically distinct contact centers. Illustratively, the switch and/or server can be a modified form of the subscriber-premises equipment sold by Avaya Inc. under the names Definity™ Private-Branch Exchange (PBX)-based ACD system, Multi-Vantage™ PBX, Communication Manager™, S8300™ media server and any other media servers, SIP Enabled Services™, Intelligent Presence Server™, and/or Avaya Interaction Center™, and any other products or solutions offered by Avaya or another company. PLEASE VERIFY.

Typically, the switch/server is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide the automatic monitoring assignment functionality described herein. Other types of known switches and servers are well known in the art and therefore not described in detail herein.

In some examples, the gateway 158 can be Avaya Inc.'s, G700 Media Gateway™ and may be implemented as hardware such as via an adjunct processor (as shown) or as a chip in the server.

In some examples, the first communication devices 134-1 to 134-N are packet-switched and can include, for example, IP hardphones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, packet-based traditional computer telephony adjuncts, peer-to-peer based communication devices, and any other communication device.

In some examples, the second communication devices 138-1 to 138-M are circuit-switched. Each of the communication devices 138-1 to 138-M corresponds to one of a set of internal extensions Ext1 to ExtM, respectively. The second communication devices can include, for example, wired and wireless telephones, PDAs, H.320 videophones and conferencing units, voice messaging and response units, traditional computer telephony adjuncts, and any other communication device.

It should be noted that the present invention does not require any particular type of information transport medium between a switch or server and first and second communication devices, i.e., the present invention may be implemented with any desired type of transport medium as well as combinations of different types of transport channels.

The packet-switched network 162 can be any data and/or distributed processing network, such as the Internet. The network 162 typically includes proxies (not shown), registrars (not shown), and routers (not shown) for managing packet flows.

The packet-switched network 162 is in communication with the external communication device 174 via a gateway 178; and the circuit-switched network 154 is in communication with the external communication device 180.

In one configuration, the central server 110, network 162, and first communication devices 134 are Session Initiation Protocol or SIP compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk.

During operation, customers contacting the contact center 100 via first and/or second external communication devices 174 and/or 180 are engaged in interactions by agents operating first and/or second communication devices 134 and/or 138. In general, these customer-agent interactions can take on any form of real-time communication. For example, the interactions may be any combination of voice conversations, instant message conversations, text message conversation, or any form of interaction between a customer and an agent where communication is conveyed in real-time. As used herein, real-time is meant to denote live interaction, and may include both synchronous and asynchronous communications. For example, agents may be engaged in both synchronous type communications (e.g., instant message, or the like) as well as asynchronous type communications (e.g., Twitter®, messages on a message board, or the like). It is important to note, that an agent may be engaged in multiple customer-agent interactions as the same time. For example, a single agent may be engaged in multiple instant message type customer-agent interactions at the same time.

It should be emphasized that the configuration of the switch, server, communication devices, and other elements as shown in FIG. 1 is for purposes of illustration only and should not be construed as limiting the invention to any particular arrangement of elements. Furthermore, assignment of agents to engage in interactions with customers is beyond the scope of this disclosure. It is noted, that a variety of techniques for assigning agents to engage customers exist and the teaching of the present disclosure may be implemented using any of these various techniques.

As stated above, the central server 110 and monitoring assignment engine 190 assigns supervisors to monitor customer-agent interactions. In general, a supervisor may monitor a customer-agent interaction by observing the interaction in a manner conducive to the type of customer-agent interaction. For example, a supervisor may monitor a voice conversation by listening to the conversation. In such an example, the supervisor's communication device may be connected (e.g., by the monitoring assignment engine, or the like) to the customer-agent interaction such that the supervisor may hear the customer-agent interaction. As another example, a supervisor may monitor an instant message conversation by reading the conversation. In such an example, the supervisor's communication device may receive the instant messages as either the customer or the agent communicates them.

In some examples, the agent and/or the customer may or may not be aware that the interaction is being monitored. In some examples, the supervisor may privately communicate with the agent during the course of monitoring the customer-agent interaction. For example, the supervisor may communicate with the agent by sending voice and/or other communications to the agent, often without the customer's knowledge.

Figure 2:
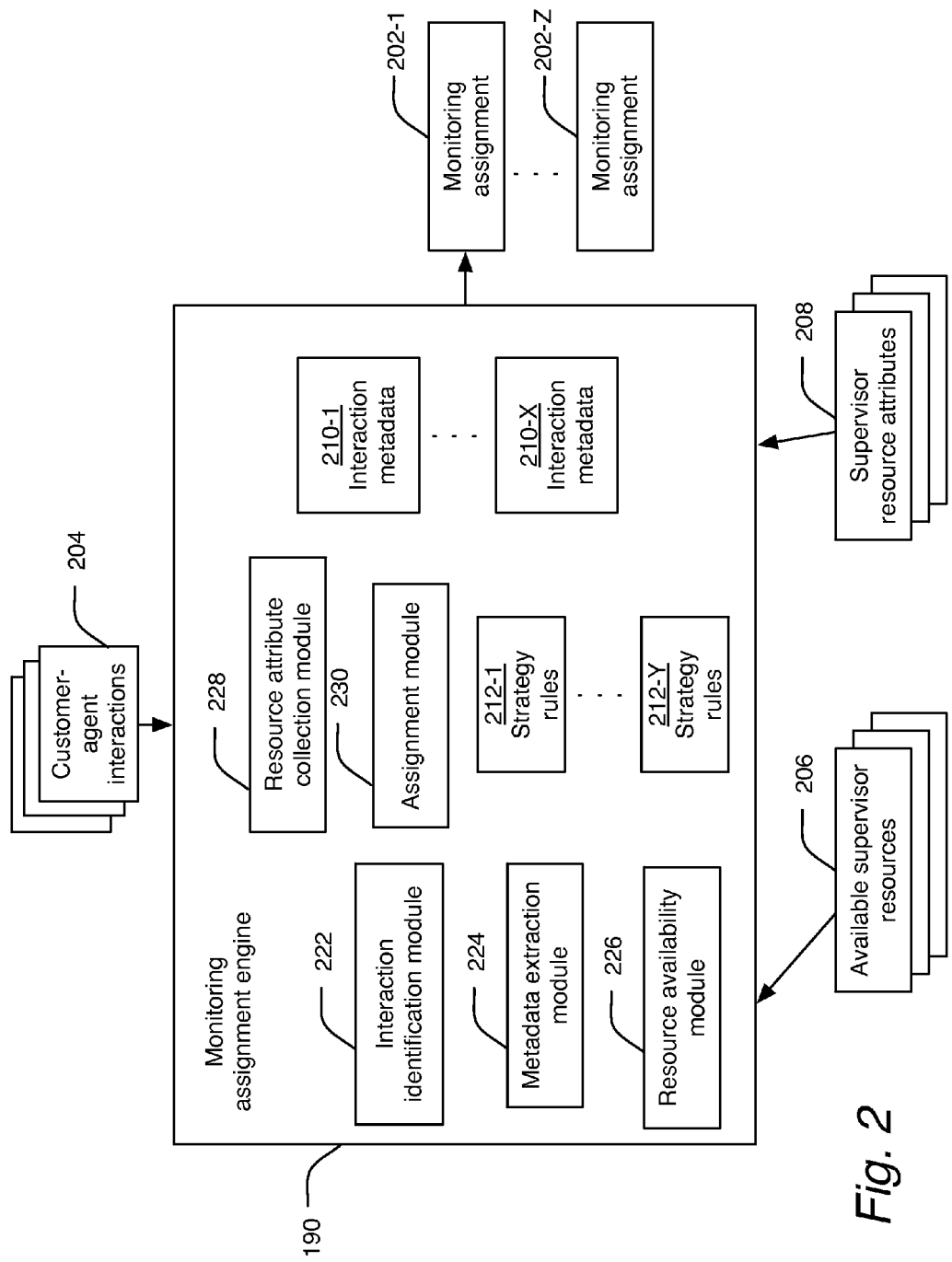
FIG. 2 is a block diagram of a monitoring assignment engine according to an embodiment of the present invention.

FIG. 2 illustrates an embodiment of the monitoring assignment engine 190. As depicted, the engine 190 is configured to assign supervisors to monitor customer-agent interactions, in the form of generating monitoring assignments 202-1 to 202-Z. The monitoring assignments correspond to the assignment of supervisors to monitor customer-agent interactions 204 based on available supervisor resources 206, supervisor resource attributes 208, interaction metadata 210, and/or monitoring assignment strategy rules 212.

The monitoring assignment engine 190 may be configured to identify customer-agent interactions 204. The monitoring assignment engine 190 may include an interaction identification module 222 configured to identify the customer-agent interactions 204. For example, the engine 190 may be notified via LAN 142 of an established customer-agent interaction by the communications component (e.g., switch 130, instant message server, text message server, web server, and/or other server) establishing the interaction. The established interaction then may be added to the customer-agent interactions 204. When an interaction ends, the communication component that established the interaction may notify the engine 190 and the interaction may be removed from the customer-agent interactions 204.

In some examples, the customer-agent interactions 204 may include all currently active customer-agent interactions. More specifically, the customer-agent interactions 204 may include all customer-agent interactions within the contact center 100 where customers are currently communicating with live agents.

The engine 190 may further be configured to extract metadata related to customer-agent interactions 204 and save the metadata as interaction metadata 210-1 to 210-X. In general, each customer interaction 204 will have at least one piece of metadata associated with it. In practice, however, each customer-agent interaction 204 may have a number of pieces of metadata associated with it.

In general, the interaction metadata 210-1 to 210-X (also referred to herein as "metadata") may be any information related to the customer-agent interactions 204. In particular, the metadata 210-1 to 210-X may be information corresponding to the need for supervisor monitoring of the customer-agent interactions 204. In some examples, the metadata 210-1 to 210-X may include one or more skills associated with the customer-agent interaction. The skills may correspond to knowledge about products, processes, access to customer information (e.g. billing, sensitive records, or the like.) In some examples, the metadata 210-1 to 210-X may include a duration of the customer-agent interaction. The duration may correspond to the time the agent has been engaged with the customer, the total time the customer has been in contact with the contact center 100, or the like. In some examples, the metadata 210-1 to 210-X may include keywords identified by an analytic engine, such as, a speech analytic engine. In some examples, the metadata 210-1 to 210-X may include information about the customer, such as, for example, length of time customer has had an account, metrics associated with the customers value to an organization, or the like.

The engine 190 may further be configured to determine available supervisor resources 206 that can be assigned to monitor customer-agent interactions 204. In general, supervisor resources are entities within the contact center 100 that have authority to monitor customer-agent interactions and/or can be assigned to monitor a customer agent interaction. A resource availability module 226 may be provided to determine the available supervisor resources 206. In some examples, the available supervisor resources may include all supervisors not either already engaged in customer-agent interactions or currently assigned to monitor a customer-agent interaction. In some examples, the available supervisor resources 206 may include all supervisor resources in the contact center 100. As will be explained in greater detail below, however, supervisor resources already engaged in customer-agent interactions or assigned monitoring may be given a new monitoring assignment by the engine 190.

The engine 190 may further be configured to collect attributes about the supervisor resources in the contact center 100. A resource attribute collection module 228 may be provided to collect supervisor resource attributes 208. In general, supervisor resource attributes 208 may include any attribute that can assist the engine 190 in generating the monitoring assignment 202-1 to 202-Z. In some examples, the supervisor resources 208 may include one or more skills with which the supervisor is trained and/or authorized to monitor. The skills may correspond to knowledge about products, processes, access to customer information, or the like. In some examples, the supervisor resources 208 may include a rank (e.g., in a supervisor hierarchy, or the like) of the supervisor resource. In some examples, the supervisor resources 208 may include a proficiency (e.g., metric associated with supervisor performance, skill at monitoring supervisor performance, or the like) of the supervisor resource. In some examples, the supervisor resources 208 may include an authority matrix. More specifically, the supervisor resources 208 may include indications of which agents and/or types of customer-agent interactions the supervisor resource is authorized to monitor.

The engine 190 may further be configured to assign one of the available supervisor resources 208 to monitor one of the customer-agent interactions 204. An assignment module 230 may be provided to generate monitoring assignments 202-1 to 202-Z. In general, the assignment module 230 matches an available supervisor resource to a customer-agent interaction by matching extracted metadata to supervisor resource attributes based on strategy rules 212-1 to 212-Y. Furthermore, in some examples, the assignment module 230 may cause the supervisor resource to monitor the customer-agent interaction (e.g., by connecting the supervisor resource to the interaction, as described above.)

In some examples, the assignment module 230 may be configured to generate a monitoring assignment for each of the customer-agent interactions 204 for which corresponding metadata 210 indicates that supervisor intervention is necessary. Said differently, the assignment module 230 may generate a monitoring assignment for a customer-agent interaction 204 when metadata corresponding to the customer-agent interaction indicates that supervisor intervention in the interaction is desired. The assignment module 230 may base the determination of whether supervisor intervention is desired on the strategy rules 212-1 to 212-Y. For example, the strategy rules may specify that supervisor intervention is desired where interaction metadata includes keywords that are outside the domain of the customer-agent interaction. More particularly, as stated above, metadata may include keywords gleaned from the interaction (e.g., by analytics, or the like). As such, where these keywords diverge from the domain of the interaction, it may be desirable to have a supervisor monitor the interaction. As another example, the strategy rules may specify that supervisor intervention is desired where metadata includes keywords outside the scope of the skill set of the agent engaged in the interaction.

In some examples, the assignment module 230 may be configured to generate monitoring assignments based on standard matching strategies, such as least occupied supervisor resource, or the like. With some example, the assignment module 230 may be configured to generate monitoring assignments based on more advanced and/or complex mechanisms. For example, the strategy rules may facilitate a dynamic adjustment to customer service goals based on available supervisor resources, or the like.

In some examples, the strategy rules 212 may specify that available supervisor resources must be prioritized to monitor higher priority customer-agent interactions when the ratio of supervisor resources to agent in the contact center is low.

In some examples, the strategy rules 212 may specify that multiple supervisors should be assigned to monitor the same customer-agent interaction (e.g., when demand is low, for a specified number or percentage of assignments, or the like.) For example, a supervisor resource with a high proficiency and a supervisor resource with a low proficiency may be assigned to monitor the same customer-agent interactions so that the higher proficiency supervisor resource may provide monitoring and/or training to the lower proficiency supervisor resource.

In some examples, the assignment module 230 may determine that a customer-agent interaction needs supervisor intervention, however, matched supervisor resources are unavailable. With some such examples, the assignment module 230 may generate a monitoring assignment and place the monitoring assignment in a queue associated with the supervisor resource assigned to monitor the interaction. As another example, in some such cases, the assignment module 230 may place the customer-agent interaction in a queue and generate a monitoring assignment when a matched supervisor resource becomes available. As a still further example, with some such cases, the assignment module 230 may generate a monitoring assignment for a supervisor resource and interrupt the supervisor resource with the monitoring assignment. For example, a supervisor resource may be interrupted and re-assigned a monitoring assignment for a particularly high value customer, for a particularly low sentiment interaction, or the like.

In some examples, the assignment module 230 may be configured to remove a supervisor resource from the available supervisor resources when a monitoring assignment is generated for the supervisor resource and correspondingly add the supervisor resource to the available supervisor resources when the customer-agent interaction for which the supervisor is assigned monitoring ends and/or when the supervisor ceases monitoring the interaction.

Figure 3:
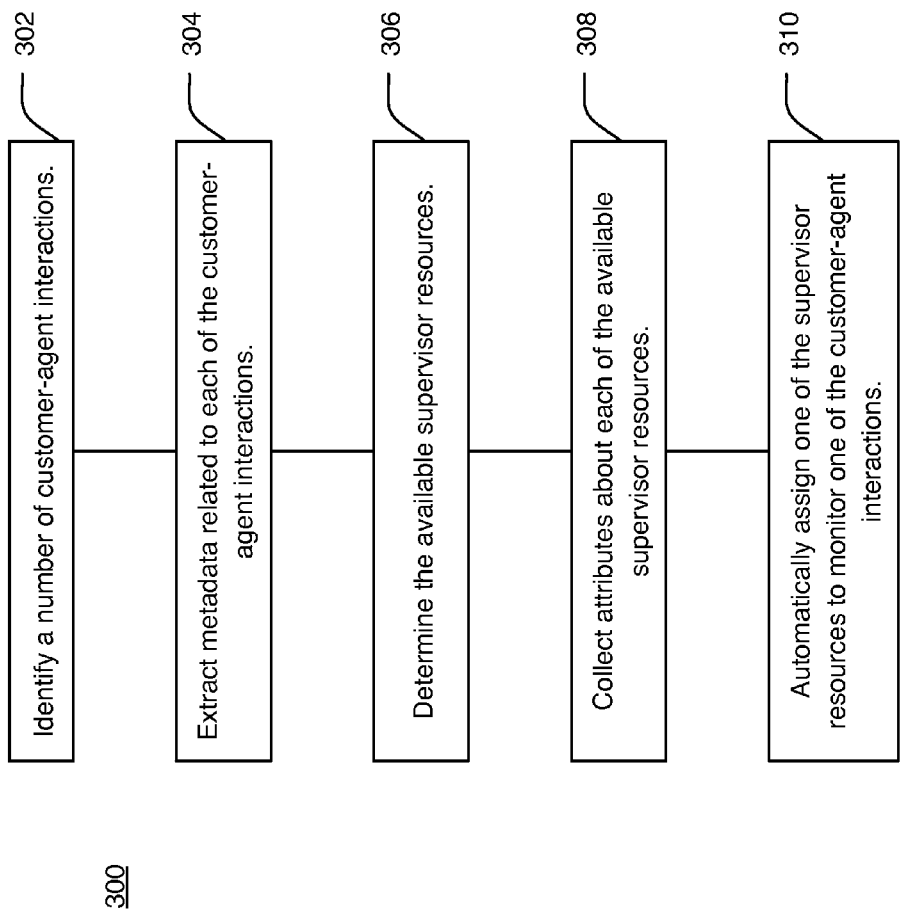
FIG. 3 is a flowchart of a method for automatic assignment of monitoring customer-agent interactions in a communication system, in accordance with an embodiment of the present invention.

FIG. 3 is a flowchart of a method 300 for assigning monitoring of customer-agent interactions in a communication system. Although the method 300 is described with reference, to the engine 190 and the contact center 100, this is not intended to be limiting. At step 302, identify a number of customer-agent interactions; the interaction identification module 222 identifies the customer-agent interactions 204. At step 304, extract metadata related to each of the customer-agent interactions; the metadata extraction module 224 extracts the interaction metadata 210.

At step 306, determine the available supervisor resources; the resource availability module 226 identifies the available supervisor resources 206. At step 308, collect attributes about each of the available supervisor resources; the resource attribute collection module 228 collects the supervisor resource attributes 208.

At step 310, automatically assign one of the supervisor resources to monitor one of the customer-agent interactions; the assignment module 230 generates the monitoring assignments 202.

The exemplary systems and methods of this present invention have been described in relation to a contact center. However, to avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments of the present invention illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the present invention.

A number of variations and modifications of the present invention can be used. It would be possible to provide for some features of the present invention without providing others.

For example in one alternative embodiment, the systems and methods of this present invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like.

In general, any device(s) or means capable of implementing the methodology illustrated herein can be used to implement the various aspects of this present invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment of the present invention, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this present invention is dependent on the speed and/or efficiency requirements of the system, the particular function, and the particular software or hardware systems or microprocessor or microcomputer systems being utilized.

In yet another embodiment of the present invention, the disclosed methods may be partially implemented in software that can be stored on a storage medium, executed on programmed general-purpose computer with the cooperation of a controller and memory, a special purpose computer, a microprocessor, or the like. In these instances, the systems and methods of this present invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the present invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. The foregoing is not intended to limit the present invention to the form or forms disclosed herein. In the foregoing Detailed Description for example, various features of the present invention are grouped together in one or more embodiments, configurations, or aspects for the purpose of streamlining the disclosure. The features of the embodiments, configurations, or aspects of the present invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system for automated assignment of monitoring to supervisor resources in a communication system, comprising:

a metadata extraction module configured to extract metadata related to each of a plurality of customer-agent interactions;
a resource attribute collection module configured to collect attributes about each of a plurality of supervisor resources in the communication system; and
an assignment module configured to execute a matching algorithm, and to assign one of the plurality of supervisor resources to monitor one of the plurality of customer-agent interactions based on a match between the extracted metadata and the collected attributes.

2. The system of claim 1, further comprising an interaction identification module configured to identify the plurality of customer-agent interactions.

3. The system of claim 1, further comprising a resource availability module configured to determine availability of the plurality of supervisor resources.

4. The system of claim 1, wherein the communication system comprises a contact center.

5. The system of claim 1, wherein the attributes about each of the plurality of supervisor resources comprise at least one of a skill, a proficiency score, a rank, or an authority matrix.

6. The system of claim 1, wherein the plurality of customer-agent interactions comprise at least one of a voice conversation between a customer and an agent, an instant message conversation between a customer and an agent, or a text message conversation between a customer and an agent.

7. The system of claim 1, wherein the metadata comprises at least one of a skill requested, duration of the customer-agent interaction, a keyword, or an attribute about the customer engaged in the customer-agent interaction.

8. The system of claim 1, wherein the metadata comprises a keyword and the metadata extraction module is configured to apply an analytic analysis of the customer-agent interaction to determine the keyword.

9. The system of claim 1, wherein the assignment module is further configured to determine a match between one of the plurality of supervisor resources and one of the plurality of customer-agent interactions based on one or more strategy rules.

10. The system of claim 1, wherein the assignment module is configured to cause the one of the plurality of supervisor resources to monitor the one of the plurality of customer-agent interactions.

11. The system of claim 1, wherein the assignment module is configured to remove the one of the plurality of supervisor resources assigned to monitor the one of the plurality of customer-agent interaction from a listing of available supervisor resources.

12. A computer-implemented method for automated assignment of monitoring customer-agent interactions in a communication system, the method comprising:
extracting metadata related to each of a plurality of customer-agent interactions;
collecting attributes about each of a plurality of supervisor resources in the communication system;
executing a matching algorithm on the extracted metadata and the collected attributes; and
assigning one of the plurality of supervisor resources to monitor one of the plurality of customer-agent interactions based on a match between the extracted metadata and the collected attributes.

13. The method of claim 12, further comprising identifying the plurality of customer-agent interactions.

14. The method of claim 12, further comprising determining the availability of the plurality of supervisor resources.

15. The method of claim 12, wherein the communication system comprises a contact center.

16. The method of claim 12, wherein the attributes about the plurality of supervisor resources comprise at least one of a skill, a proficiency score, a rank, or an authority matrix.

17. The method of claim 12, wherein the plurality of customer-agent interactions comprise at least one of a voice conversation between a customer and an agent, an instant message conversation between a customer and an agent, or a text message conversation between a customer and an agent.

18. The method of claim 12, wherein the metadata comprises at least one of a skill requested, duration of the customer-agent interaction, a keyword, or an attribute about the customer engaged in the customer-agent interaction.

19. The method of claim 12, wherein executing the matching algorithm on the extracted metadata and the collected attributes further comprising determining a match between one of the plurality of supervisor resources and one of the plurality of customer-agent interactions based on one or more strategy rules.

20. A non-transitory computer readable medium storing computer readable instructions when executed by a processor perform a method comprising:
extracting metadata related to each of a plurality of customer-agent interactions;
collecting attributes about each of a plurality of supervisor resources in the communication system;
executing a matching algorithm on the extracted metadata and the collected attributes; and
assigning one of the plurality of supervisor resources to monitor one of the plurality of customer-agent interactions based on a match between the extracted metadata and the collected attributes.

* * * * *